United States Patent
Asano et al.

(10) Patent No.: US 11,201,529 B2
(45) Date of Patent: Dec. 14, 2021

(54) ROTARY ELECTRIC MACHINE

(71) Applicants: DAIKIN INDUSTRIES, LTD., Osaka (JP); NAGOYA INSTITUTE OF TECHNOLOGY, Nagoya (JP)

(72) Inventors: Yoshinari Asano, Osaka (JP); Toshinari Kondou, Osaka (JP); Yoshihito Sanga, Osaka (JP); Yoshifumi Maeda, Osaka (JP); Takashi Kosaka, Nagoya (JP)

(73) Assignees: DAIKIN INDUSTRIES, LTD., Osaka (JP); NAGOYA INSTITUTE OF TECHNOLOGY, Nagoya (JP)

( * ) Notice: Subject to any disclaimer, the term of this patent is extended or adjusted under 35 U.S.C. 154(b) by 78 days.

(21) Appl. No.: 16/470,318

(22) PCT Filed: Dec. 20, 2017

(86) PCT No.: PCT/JP2017/045828
§ 371 (c)(1),
(2) Date: Jun. 17, 2019

(87) PCT Pub. No.: WO2018/117195
PCT Pub. Date: Jun. 28, 2018

(65) Prior Publication Data
US 2020/0119630 A1     Apr. 16, 2020

(30) Foreign Application Priority Data

Dec. 20, 2016  (JP) .............................. JP2016-246590

(51) Int. Cl.
*H02K 21/04* (2006.01)
*H02K 1/17* (2006.01)
(Continued)

(52) U.S. Cl.
CPC ............. *H02K 23/34* (2013.01); *H02K 1/165* (2013.01); *H02K 1/17* (2013.01); *H02K 3/47* (2013.01);
(Continued)

(58) Field of Classification Search
CPC .......... H02K 1/17; H02K 19/12; H02K 21/04; H02K 21/44; H02K 23/24; H02K 23/40; H02K 3/47; H02K 21/38
See application file for complete search history.

(56) References Cited

U.S. PATENT DOCUMENTS

| 4,011,479 A | * | 3/1977 | Volkrodt | H02K 3/20 |
| | | | | 310/186 |
| 6,051,904 A | * | 4/2000 | Akemakou | H02K 21/44 |
| | | | | 310/171 |

(Continued)

FOREIGN PATENT DOCUMENTS

| CN | 101277053 A | * | 10/2008 | ............. H02K 21/38 |
| CN | 101510701 A | | 8/2009 | |

(Continued)

OTHER PUBLICATIONS

English machine translation, Yang et al., CN 103051139 B (Year: 2012).*

(Continued)

*Primary Examiner* — Burton S Mullins
(74) *Attorney, Agent, or Firm* — Birch, Stewart, Kolasch & Birch, LLP.

(57) ABSTRACT

A stator core including field slots housing field windings and armature slots housing armature windings is provided. Permanent magnets are housed in the respective armature slots. Field windings face to the permanent magnets directly or via the stator core on the outer and inner circumferential sides. A coil end of one of the armature windings straddles the (Continued)

predetermined one of the field slots and passes over the axial end face of each of the permanent magnets in the corresponding one of the field slots over which the coil end straddles.

7 Claims, 9 Drawing Sheets

(51) Int. Cl.
| | |
|---|---|
| *H02K 21/44* | (2006.01) |
| *H02K 21/38* | (2006.01) |
| *H02K 23/34* | (2006.01) |
| *H02K 1/16* | (2006.01) |
| *H02K 3/47* | (2006.01) |
| *H02K 23/40* | (2006.01) |

(52) U.S. Cl.
CPC ............ *H02K 21/04* (2013.01); *H02K 21/44* (2013.01); *H02K 23/40* (2013.01)

(56) References Cited

U.S. PATENT DOCUMENTS

| | | | | |
|---|---|---|---|---|
| 6,242,834 B1 * | 6/2001 | Akemakou | ............ | H02K 19/24 310/162 |
| 6,777,842 B2 * | 8/2004 | Horst | ............ | H02K 21/04 310/154.11 |
| 6,894,417 B2 * | 5/2005 | Cai | ............ | H02K 3/12 310/198 |
| 7,868,506 B2 * | 1/2011 | Hoang | ............ | C23C 4/04 310/181 |
| 8,076,811 B2 * | 12/2011 | Zhu | ............ | H02K 21/44 310/154.11 |
| 8,575,810 B2 * | 11/2013 | Nishiyama | ............ | H02K 21/44 310/181 |
| 8,633,628 B2 * | 1/2014 | Jung | ............ | H02K 21/44 310/181 |
| 9,698,659 B2 * | 7/2017 | Manfe | ............ | H02K 19/26 |
| 2010/0038978 A1 | 2/2010 | Hoang et al. | | |
| 2014/0239763 A1 * | 8/2014 | Raminosoa | ............ | H02K 1/2773 310/154.44 |
| 2016/0118848 A1 * | 4/2016 | Raminosoa | ............ | H02K 1/02 310/154.01 |
| 2017/0250594 A1 | 8/2017 | Asano et al. | | |

FOREIGN PATENT DOCUMENTS

| | | | | |
|---|---|---|---|---|
| CN | 101552527 A | | 10/2009 | |
| CN | 101789641 A | | 7/2010 | |
| CN | 201868960 U | | 6/2011 | |
| CN | 103051139 B | * | 12/2012 | ............ H02K 21/38 |
| DE | 102011121174 A1 | * | 6/2013 | ............ H02K 21/38 |
| DE | 102013218484 A1 | * | 3/2015 | ............ H02K 21/44 |
| GB | 2468696 A | * | 9/2010 | ............ H02K 21/44 |
| GB | 2475995 B | * | 2/2012 | ............ H02K 1/17 |
| JP | 11-308829 A | | 11/1999 | |
| JP | JP 2013-201869 A | | 10/2013 | |
| JP | 2016-32385 A | | 3/2016 | |
| JP | JP 2018-11396 A | | 1/2018 | |
| WO | WO 2013157165 A1 | * | 10/2013 | ............ H02K 1/17 |

OTHER PUBLICATIONS

English machine translation, Hua et al., CN 101277053 A (Year: 2008).*

K.Matsumoto et al. "Design Studies on High Torque Flux Switching Motors with Hybrid Field Excitation", The Papers of Technical Meeting on Vehicle Technology, IEE Japan, 2012, pp. 31-36 (Year: 2012).*

International Search Report, issued in PCT/JP2017/045828, dated Mar. 6, 2018.

Extended European Search Report, dated May 13, 2020, for European Application No. 17884022.9.

* cited by examiner

W1 ≦ 2·W2

ROTARY ELECTRIC MACHINE

TECHNICAL FIELD

The present invention relates to a rotary electric machine.

BACKGROUND ART

Among electric motors, which are one type of rotary electric machines, there is known a hybrid excitation flux switching motor (hereinafter also referred to as HEFSM). In HEFSM, a stator is provided with both windings and permanent magnets. HEFSM has an operating mode in which the magnetic flux of the permanent magnets flows from the stator to a rotor (see for example Patent Document 1). In the invention of Patent Document 1, predetermined ones of windings (field windings) are in contact with some of permanent magnets. The conduction of a direct current to the field windings is controlled to control the magnetic flux of the permanent magnets. In addition, AC power is supplied to the other windings (armature windings) for forming rotating magnetic field to rotate the rotor.

CITATION LIST

Patent Document

Patent Document 1: Japanese Unexamined Patent Publication No. 2013-201869

SUMMARY OF THE INVENTION

Technical Problem

However, it is common among the hybrid excitation flux switching motors that there are two types of windings, i.e., field windings and armature windings, which are arranged in a complicated manner, often causing larger coil ends and sometimes resulting in a smaller space factor. This becomes even more problematic, particularly in case where field windings are provided on the inner and the outer circumferential sides of the permanent magnets, because the windings are arranged in a much more complicated manner.

The present invention has been made in view of the above problems, and an object of the present invention is to reduce the size of a coil end in a hybrid excitation flux switching motor.

Solution to the Problem

In order to achieve the object, a first aspect of the present invention is directed to a rotary electric machine. The rotary electric machine includes: field windings (23) supplied with DC power; armature windings (24) supplied with AC power; a stator core (21) formed into a ring-like shape including slots (213) including slots (213) including field slots (213a) and armature slots (213b), the field slots (213a) housing the field windings (23), the armature slots (213b) housing the armature windings (24), the field slots (213a) and the armature slots (213b) being formed in a circumferential direction of the stator core; permanent magnets (22) housed in magnet slots (215) formed in the field slots (213a) side by side on an inner circumferential side or on an outer circumferential side of the field slots; and a rotor core opposite to the stator core (21), with predetermined air gap (G) being interposed therebetween, wherein the permanent magnets (22) face directly to the field windings (23) or face to the field windings (23) with the stator core (21) interposed therebetween, both on the outer circumferential side and on the inner circumferential side in the field slots (213a) or the magnet slots (215), coil ends (24e) of the armature windings (24) straddle predetermined ones of the field slots (213a) and pass over an axial end face of the permanent magnets (22) in the predetermined field slots (213a)

In this configuration, the coil end (24e) of the armature windings (24) passes over the axial end face of the permanent magnets (22). Hence, in this configuration, in the present embodiment, it is possible to prevent the field windings (23) and the armature windings (24) from intersecting each other.

A second aspect is an embodiment of the first aspect. In the second aspect, a radial width (W1) of the armature slots (213b) is equal to or less than twice as large as a radial width (W2) of the permanent magnets (22).

In this configuration, the coil end (24e) of the armature windings (24) is arranged such that it does not extend out of the axial end face of the respective permanent magnets (22).

A third aspect is an embodiment of one of the first aspect or the second aspect. In the second aspect, the armature windings (24) are made of segment coils.

In this configuration, it is possible to enhance the space factor.

A fourth aspect is an embodiment of any one of the first to third aspects. In the fourth aspect, the stator core (21) has an edge portion (212b) closer to the outer circumferential side than the armature slots (213b) are, the coil end (23e) of the field windings (23o) arranged on the outer circumferential side of the permanent magnets (22) pass over the axial end face of the edge portion (212b), and a radial width (W3) of the edge portion (212b) is larger than the radial width (W4) of the field windings (23o) arranged on the outer circumferential side of the permanent magnets (22).

In this configuration, the coil end (23e) of the armature winding (23o) does not go farther than the stator core (21) does on the outer circumferential side.

A fifth aspect is an embodiment of any one of the first to fourth aspects. In the fifth aspect, the stator core (21) includes teeth (211), between the field slots (213a) and the armature slots (213b), around which at least one of the field windings (23) and armature windings (24) are wound, the teeth (211) facing to the armature slots (213b) are provided with flanges (211c) protruding into the armature slots (213b), and the coil end (23e) of the field windings (23i) arranged on the inner circumferential side of the permanent magnets (22) passes over the axial end face of the flange (211c).

In this configuration, the selected passing area of the coil end (23e) of the field winding (23i) keeps the armature windings (24) from passing over the selected passing area.

A sixth aspect is an embodiment of any one of the first to fifth aspects. In the sixth aspect, the coil end (23e) of the field windings (23i) arranged on the inner circumferential side of the permanent magnets (22) passes over at least one of the air gap (G) and the axial end face of the rotor core (11).

In this configuration, the selected passing area of the coil end (23e) of the field winding (23i) keeps the armature windings (24) from passing over the selected passing area.

A seventh aspect is an embodiment of any one of the first to sixth aspects. In the seventh aspect, a face of the permanent magnets (22) facing to the field windings (23) is parallel to a direction in which the coil end (24e) of the armature windings (24) passes over the axial end face of the permanent magnets (22).

In this configuration, the coil ends of the armature windings (24) can be arranged linearly.

Advantages of the Invention

According to the first aspect, the field windings and the armature windings can be arranged not to intersect each other. This enables the downsizing of a coil end in a hybrid excitation flux switching motor.

Further, according to the second aspect, the downsizing of a coil end can be achieved more reliably.

Furthermore, according to the third aspect, it is possible to achieve the downsizing of a coil end as well as the improvement of the space factor.

Moreover, according to the fourth aspect, the coil ends are included in the field windings and located closer to the outer circumferential side than the permanent magnets are. Accordingly, the coil ends included in the field windings do not interfere with those of the armature windings.

Further, according to the fifth or the sixth aspects, the coil ends, which are included in the field windings and located closer to the inner circumferential side than the permanent magnets are, do not interfere with the coil ends of the armature windings.

Furthermore, according to the seventh aspect, it is easily possible to form the coil ends of the armature windings.

DESCRIPTION OF EMBODIMENTS

Embodiments of the present invention will be described in detail below with reference to the drawings. The embodiments below are merely exemplary ones in nature, and are not intended to limit the scope, applications, or use of the present invention.

First Embodiment

Figure 1:
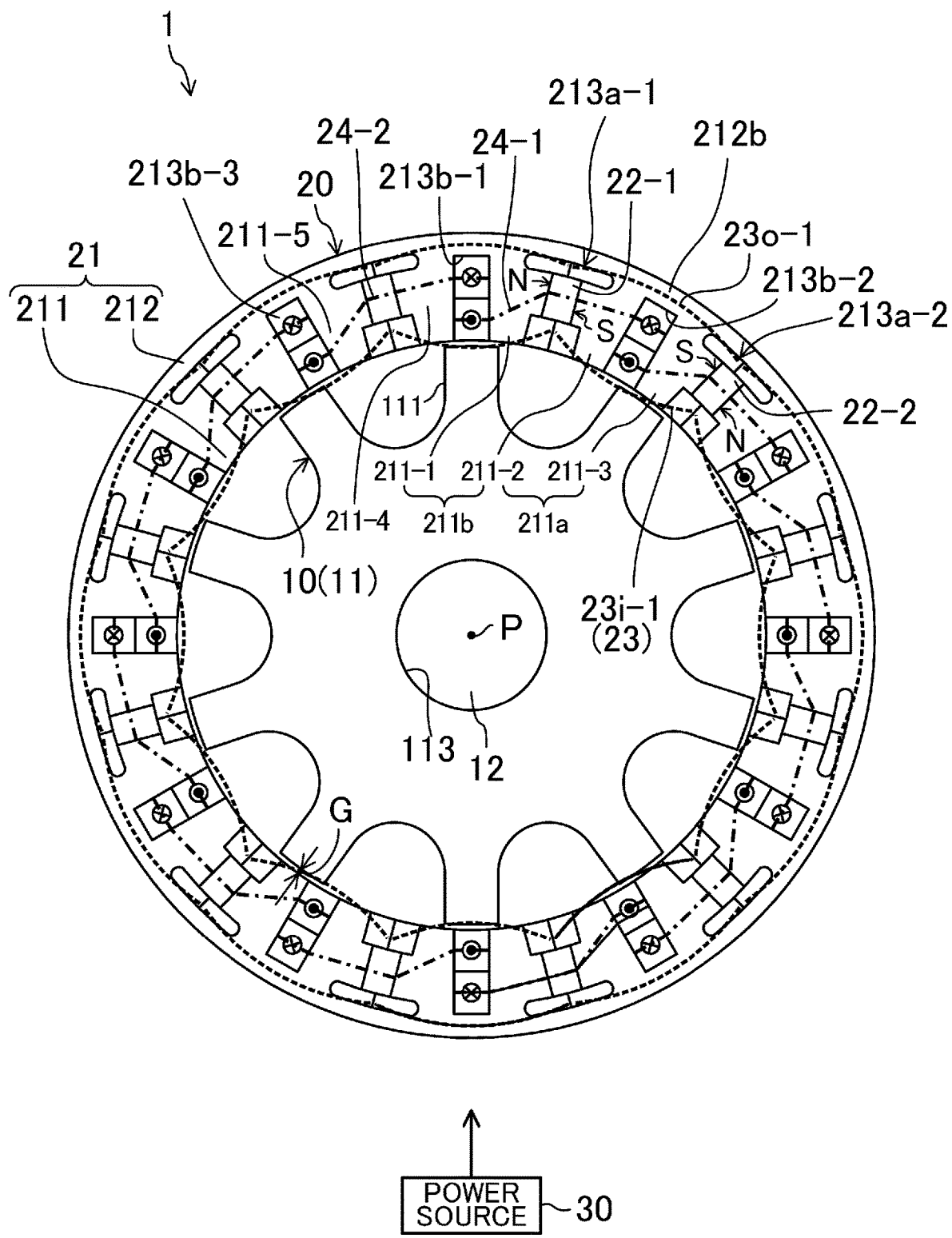
FIG. 1 is a cross-sectional view showing a structure of an electric motor of a first embodiment.

Hereinafter, an example of an electric motor will be described as an example of the rotary electric machine of the present invention. FIG. 1 is a cross-sectional view showing a structure of an electric motor (1) of a first embodiment. This electric motor (1) is an example of HEFSM. As shown in FIG. 1, the electric motor (1) includes a rotor (10) and a stator (20), which are opposite to each other with a predetermined air gap (G) interposed therebetween, and housed in a casing (not shown). The electric motor (1) can be used for a motor vehicle or for a compressor of an air conditioner. The electric motor (1) drives, with a drive shaft (12) provided in the rotor (10), a motor vehicle transmission or the compressor of the air conditioner.

Out of the terms used in the following description, an "axial" direction is the direction in which an axis (P) of a drive shaft (12) extends, whereas a "radial" direction is the direction orthogonal to the axis (P). An "outer circumferential side" of a component is a side farther from the axial center (P), while an "inner circumferential side" refers to a side closer to the axial core (P).

<Rotor>

The rotor (10) includes a rotor core (11) and the drive shaft (12). The rotor core (11) is made of a soft magnetic material. The rotor core (11) of the present embodiment is a multilayer core formed by stacking, in the axial direction, many core members obtained by pressing an electromagnetic sheet. In the center of the rotor core (11), there is formed a through-hole (113), into which the drive shaft (12) is inserted, as shown in FIG. 1. The rotor core (11) is provided with a plurality of projections (111) projecting toward the outer circumferential side. The projections (111) are arranged at regular pitches in the circumferential direction of the rotor core (11). That is, the rotor core (11) has a gear-like shape as viewed in the axial direction. The projections (111) are provided such that inductance varies in accordance with the relative position of the rotor (10) with respect to the stator (20). It is also possible to provide the stator core formed into a thin shape along the outer circumference of a concave portion so that the entire outer circumference of the stator (10) may be an exact circle. The projections (111) are not always necessarily arranged at exact regular intervals.

<Stator>

The stator (20) includes a stator core (21), permanent magnets (22), field windings (23) and armature windings (24).

Figure 2:
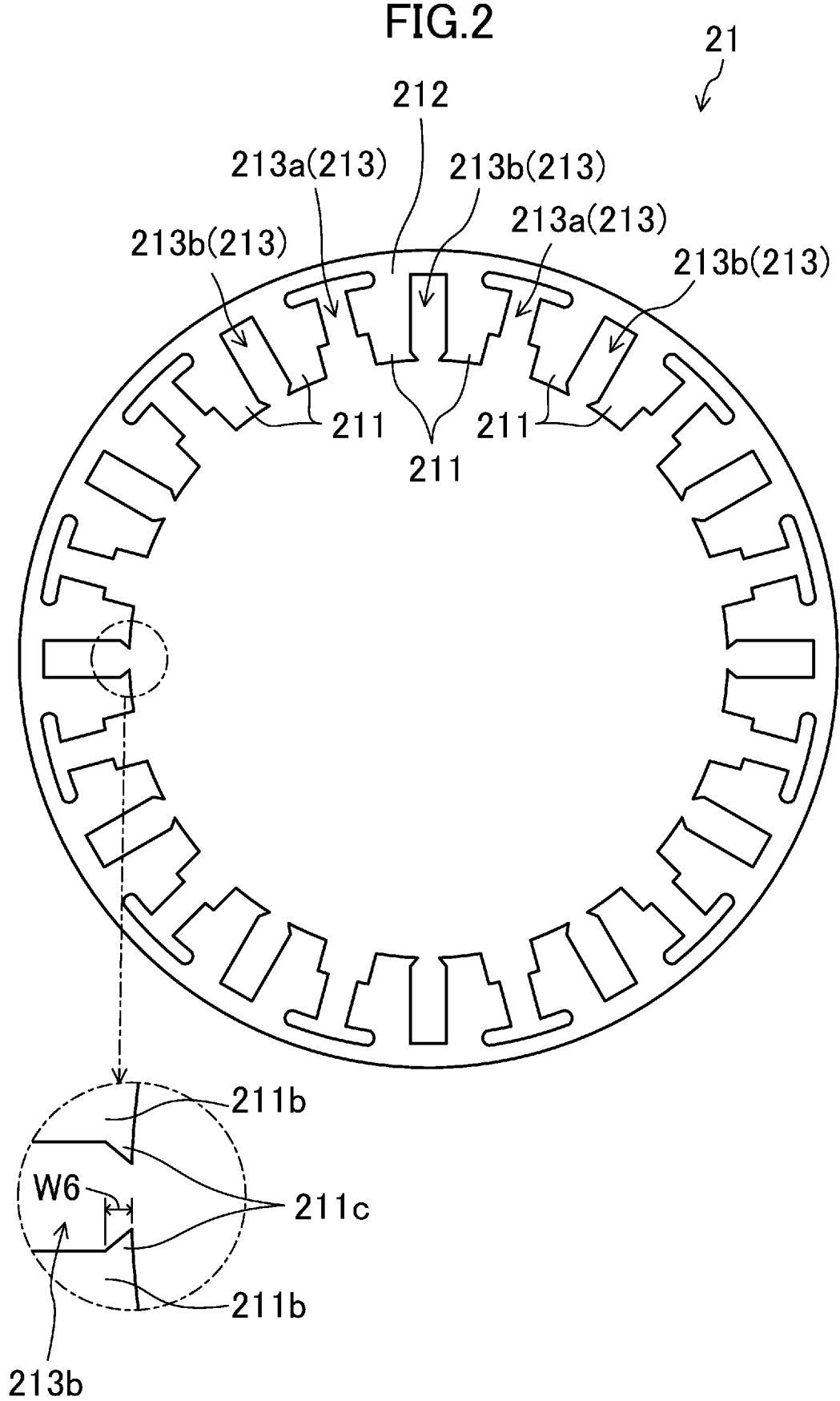
FIG. 2 is a view of a stator core as viewed in an axial direction.

The stator core (21) is made of a soft magnetic material and formed into a ring-like shape. In this example, the stator core (21) is a multilayer core formed by stacking, in the axial direction, many core members obtained by pressing an electromagnetic sheet. FIG. 2 illustrated the stator core as viewed in the axial direction. As shown in FIG. 2, the stator core (21) includes a stator yoke (212) and a plurality of teeth (211). The stator yoke (212) is formed in a ring-like shape on the outer circumferential side of the stator core (21). The teeth (211) project from the inner circumferential surface of the stator yoke (212) toward the inner circumferential side. In the example of FIG. 2, 24 teeth (211) are provided, which are arranged at predetermined pitches in the circumferential direction around the axis (P). As a result, a space is formed between each adjacent pair of the teeth (211).

These spaces formed between the respective adjacent teeth (211) function as slots (213) housing the permanent magnets (22), the field windings (23) and the armature windings (24). The slots (213) include two types of: field slots (213a); and armature slots (213b). Specifically, the field slots (213a) are pairs of the slots (213), each of which are adjacent to each other along the circumference of the stator yoke (212), with one of the slots interposed therebetween. The armature slots (213b) are those of the slots (213) which are other than the field slots (213a). In other words, the field slots (213a) and the armature slots (213b) are arranged alternately along the circumference of the stator yoke (212). The teeth (211) facing to the corresponding one of the armature slots (213b) are provided with projections (referred to as flanges (211c)) projecting toward the inside of the corresponding one of the armature slots (see FIG. 2). Hereinafter, if specific ones of the elements, such as the field slots (213a) and the armature slots (213b) existing in plurality are focused on, branch numbers will be added to their reference characters (for example, 213a-1, 213a-2 etc.).

—Armature Windings (24)—

The armature windings (24) are for forming rotating magnetic fields. The armature windings (24) are supplied with AC power for the purpose of the formation of rotating magnetic fields. For example, if the armature windings (24) are three-phase armature windings, the armature windings (24) should be supplied with three-phase AC power. The AC electricity flowing through the armature windings (24) can be controlled through an inverter circuit, etc.

In the stator (20), each of the armature windings (24) is wound around the corresponding ones of the teeth (211) and housed in the corresponding ones of the armature slots (213b). More specifically, each of the armature windings (24) is wound around the corresponding one of the pairs of the teeth (211) (hereinafter also referred to as a pair of armature teeth (211b)) interposed between a pair of the armature slots (213b) adjacent to each other along the circumference of the stator yoke (212). Specifically, each of the armature windings (24) is wound around the corresponding one of the pairs of the armature teeth (211b), with the radial axis regarded as a winding axis. In other words, each of the armature windings (24) is, as a concentrated winding, wound around the corresponding one of the pairs of the teeth (211b) regarded as a single teeth. As viewed specifically in FIG. 1, for example, an armature winding (24-1) is wound around the corresponding ones of the pairs of the armature teeth (211b) composed of teeth (211-1) and (211-2) interposed between the armature slots (213b-1) and (213b-2), which are adjacent to each other along the circumference of the stator yoke (212).

Similarly, another armature winding (24-2) is wound around the corresponding one of the pairs of the armature teeth (211b) composed of teeth (211-4) and (211-5) interposed between the armature slots (213b-1) and (213b-3), which are adjacent to each other along the circumference of the stator yoke (212). In this way, according to this embodiment of the present invention, each of the armature slots (213b) houses corresponding two of the armature windings (24).

—Field Windings (23)—

The field windings (23) are for controlling the magnetic flux of the permanent magnets (22). Each of these field windings (23) is wound around the corresponding ones of the teeth (211) and housed in the corresponding one of the field slots (213a). In this example, two field windings (23) are wound around the corresponding one of the pairs of teeth (211) (hereinafter also referred to as a pair of field teeth (211a)) interposed between one of pairs of field slots (213a), which are adjacent to each other along the circumference of the stator yoke (212). Specifically, each of two field windings (23) is wound around the corresponding one of the pairs of field teeth (211a), with the radial axis regarded as the winding axis. In other words, two of the field windings (23) are, as concentrated windings, wound around one of the pairs of field teeth (211a) regarded as a single teeth. In this way, according to this embodiment of the present invention, two of the field windings are housed in the corresponding one of the field slots (213a). In this example, two field windings (23) in the corresponding one of the field slots (213a) are adjacent to each other along the circumference of the stator yoke (212).

These field windings (23) are DC-energized, if necessary. For this purpose, the field windings (23) are connected to a power source (30) (see FIG. 1). Further, various type of power sources (30) may be used as the power source supplying DC electricity to the field windings (23). For example, a chopper circuit (e.g., a step-down chopper circuit, a step-up chopper circuit or a step-up-and-down chopper circuit) may be used as the power source (30) to easily control the direct current flowing to the field windings (23). In other words, the direct current flowing to the field windings (23) may contain a pulsating component.

—Permanent Magnets (22)—

The stator (20) is provided with a plurality of permanent magnets (22). In this example, the permanent magnets (22) are rare-earth magnets made of a rare-earth element. More specifically, the permanent magnets (22) are magnets (neodymium-iron-boron based magnets) containing neodymium, iron and boron as main components, and rare-earth magnets containing, if necessary, an alloy made of a heavy rare-earth element (e.g., dysprosium (Dy) or terbium (Tb)) or sintered magnets containing, only around their surface, a heavy rare-earth element by grain boundary diffusion.

Each of the permanent magnets (22) is formed into a quadrangular shape in its cross section (the plane shown in FIG. 1) orthogonal to the axis (P) (in this example, a rectangular cross-section with longer sides in the radial direction). The permanent magnets (22) have almost the same axial length as the stator core (21). That is, the permanent magnets (22) of this embodiment are rectangular parallelepipeds. Each of these permanent magnets (22) is arranged in the corresponding one of the field slots (213a) such that each magnetic pole face of one of the permanent magnets (22) faces to the magnetic pole face, of the adjacent one of the permanent magnets (22) with the same polarity, along the circumference of the stator yoke (212) (see FIG. 1). In other words, the permanent magnets (22) are magnetized along the circumference of the stator yoke (212). These permanent magnets (22) are arranged such that their magnetic pole faces facing in one direction along the circumference of the stator yoke (212) have alternately different polarity.

Figure 3:
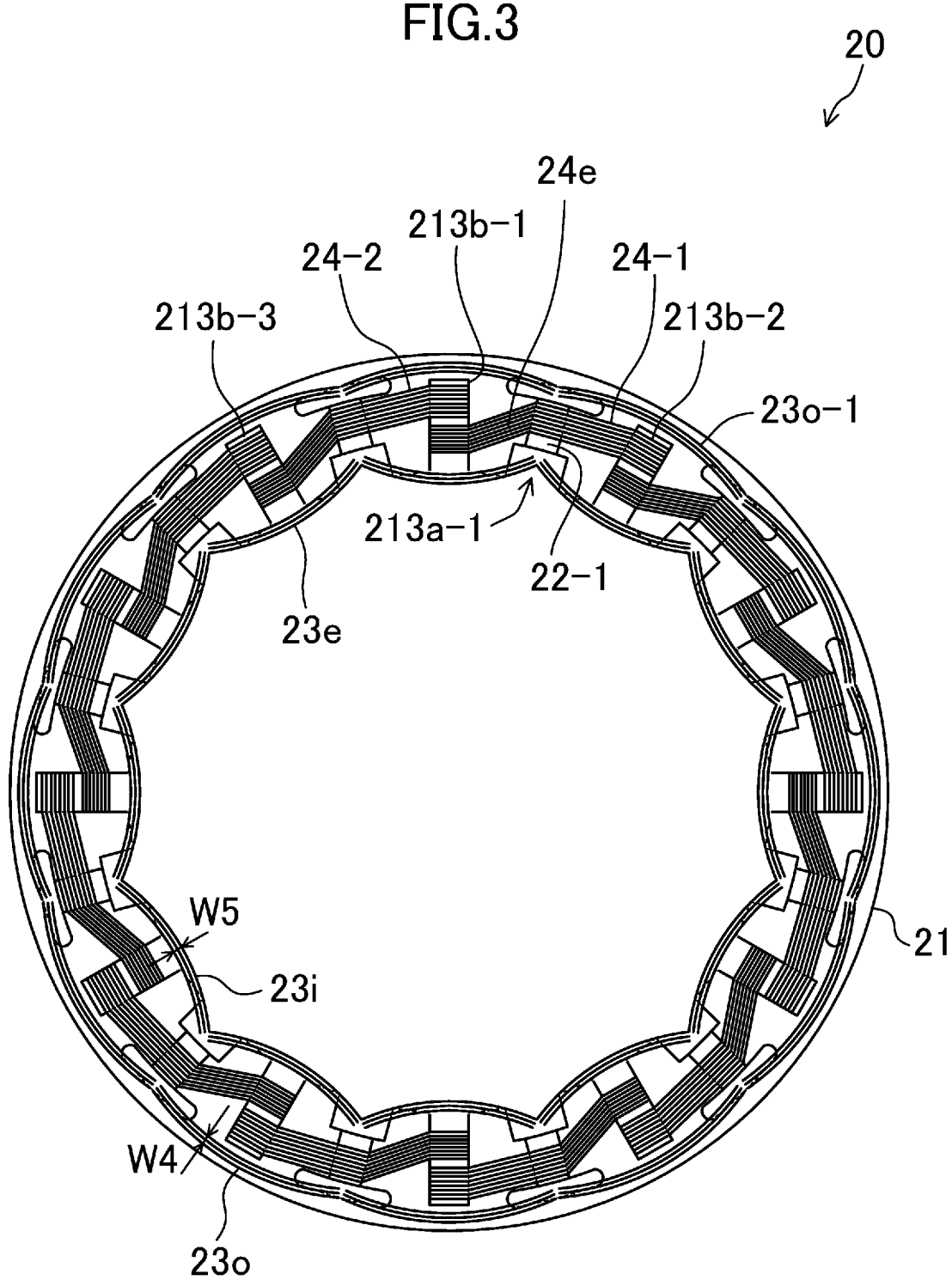
FIG. 3 is a view showing an arrangement of coil ends of armature windings, etc.

As for the relationship of the permanent magnets (22) to the armature windings (24), in this example, each of the armature windings (24) straddles the predetermined one of the field slots (213a). A coil end of each of the armature windings are arranged such that it passes over respective axial end faces of the permanent magnet (22) in the predetermined one of the field slots (213a) which the each armature winding (24) straddles. FIG. 3 shows an arrangement of coil ends of the armature windings (24) etc. Take an armature winding (24-1) as an example, this armature winding (24-1) straddles a field slot (213a-1), as shown in FIG. 3. The coil end (24e) of the armature winding (24-1) is arranged to pass over the axial end face of a permanent magnet (22-1) in the field slot (213a-1).

One side of this armature winding (24-1) is housed in an armature slot (213b-1). Another armature winding (24-2) is also housed in this armature slot (213b-1). The armature slot (213b-1) houses the armature winding (24-1) on its inner circumferential side and the armature winding (24-2) on its outer circumferential side. In the same manner, in this embodiment, a total of 12 coil ends (24e) of the respective armature windings (24) are arranged on the end face of the stator core (21). In this embodiment, the size of the slots (213) etc. of the stator core (21) is designed to be suitable to facilitate the above mentioned arrangement of the coil ends.

Figure 4:
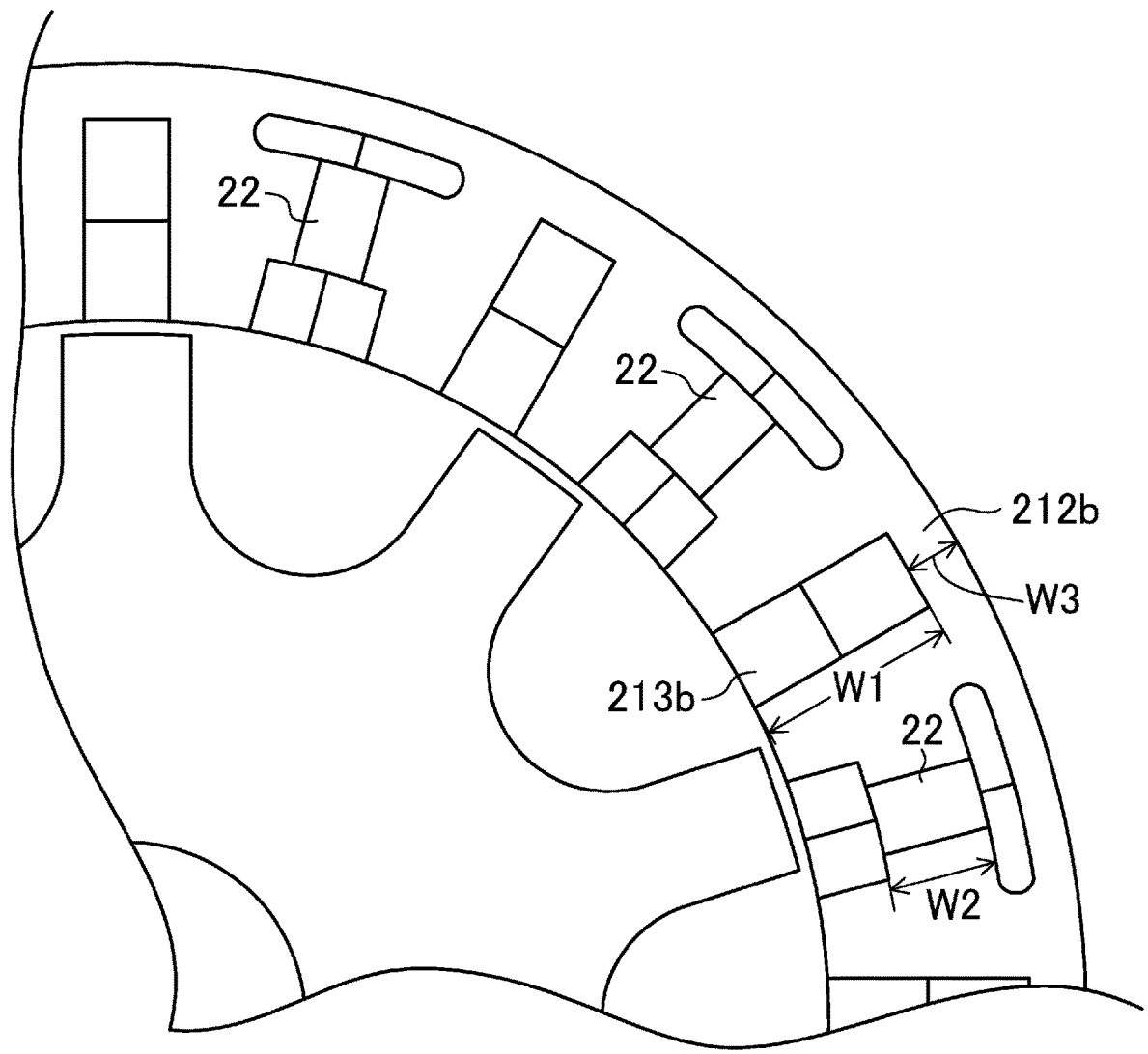
FIG. 4 is a view showing a dimensional relationship of slots and other components of the first embodiment.

FIG. 4 illustrates the dimensional relationship of the slots (213) and other components in this embodiment. In this example, the radial width (W1) of the armature slot (213b) is set to be equal to or less than twice as long as the radial width (W2) of one of the permanent magnets (22). Through this setting, the radial width of one of the armature windings (24) is smaller than the radial width (W2) of the respective permanent magnets (22). As a result, it can be ensured that a coil end (24e) of one of the armature windings (24) passes only over the axial end face of the respective permanent magnets (22). That is, the coil end (24e) of the armature winding (24) is arranged such that it does not extend out of the axial end face of the respective permanent magnets (22).

As for the relationship of the permanent magnets (22) to the field windings (23), FIG. 1 shows that the field windings (23) face to one of the permanent magnets (22) on both inner and outer circumferential side of the permanent magnet (22) in the field slot (213a). More specifically, two of the field windings (23) are provided for one of the pairs of the teeth (211a). These field windings (23) are in contact with one of the permanent magnets (22) on both inner and outer circumferential sides of the permanent magnet (22). The ones of the field windings (23), which face to each other on the inner and outer circumferential sides, with the corresponding one of the permanent magnets (22) interposed therebetween, are wound in the same direction as viewed from ends of the field windings (23), through which a current from the power supply (30) flows in.

In the following description, if the field windings (23) on the inner and outer circumferential sides of the permanent magnets (22) need to be distinguished from each other, the field windings (23) on the inner circumferential side are represented by field windings (23i), with the suffix "i" added to the reference numeral of the field windings (23), while the field windings (23) on the outer circumferential side are represented by field windings (23o), with the suffix "o" added to the reference numeral of the field winding (23). If specific ones of the field windings (23i) on the inner circumferential sides and the field windings (23o) are focused on, branch numbers are further added to the suffixes (e.g., 23i-1 and 23o-1).

The layout of the permanent magnets (22) and the field windings (23) according to this embodiment is viewed specifically in FIG. 1. For example, the field winding (23o-1) is wound around the pair of field teeth (211a) composed of the teeth (211-2) and (211-3) interposed between the field slots (213a-1) and (213a-2) adjacent to each other in the circumference of the stator yoke (212). The field winding (23o-1) is located closer to the outer circumferential side than the permanent magnet (22-1) or (22-2) is. Similarly, the field winding (23i-1) is wound around the teeth (211-2) and (211-3). This field winding (23i-1) is located closer to the inner circumferential side than the permanent magnet (22-1) or the permanent magnet (22-2) is.

In this example, all the field windings (23o) on the outer circumferential sides of the permanent magnets (22) are made of a common wire material (a single covered electric wire). All the field windings (23i) on the inner circumferential sides of the permanent magnets (22) are also made of a common wire material. In order to form the field windings (23) from a common wire material in this manner, the wire material may be wound around another one of the pairs of the field teeth (211a), and then continuously wound around the pair of the field teeth (211a) adjacent to the one of the pairs of field teeth in the direction opposite to the direction, in which the wire material is wound around the one of the pairs.

In this embodiment, also for the armature winding (23), the size of the stator core (21) is designed to be suitable for the arrangement of the coil end (23e). As can be seen from FIG. 4, the stator core (21) has an edge portion (hereinafter referred to as an armature yoke part (212b)) on the outer circumferential side closer than the armature slot (213b) is. The coil end (23e) of the armature winding (23o) arranged on the outer circumferential side of the permanent magnet (22) passes over the axial end face of the armature yoke part (212b) (FIG. 3). The radial width (W3) of the armature yoke part (212b) is greater than the radial width (W4) of the armature winding (23o) (see FIG. 3). Therefore, the coil end (23e) of the armature winding (23o) neither goes farther than the stator core (21) does on the outer circumferential side, nor interferes with the armature winding (24) in the armature slot (213b). That is, the coil end (23e) of the field winding (23o) can pass over only the axial end face of the armature yoke part (212b).

On the other hand, the passing area of the coil end (23e) of the field winding (23i) arranged on the inner circumferential side of the permanent magnet (22) is predetermined so that the coil end (23e) does not interfere with the armature winding (24) in the armature slot (213b). Specifically, at least one of the axial end face of flanges (211c), an air gap (G), and the axial end face of the rotor core (11) is the designated passing area of the coil end (23e). For example, in the case where the radial width (W5) of the field winding (23i) on the inner circumferential side of the permanent magnet (22) (see FIG. 3) is greater than the radial width (W6) of the flanges (211c), the coil end (23e) of the field winding (23i) may pass over both the flanges (211c) and the air gap (G). FIG. 3 shows an example in which the field winding (23i) on the inner circumferential side straddles both the flanges (211c) and the air gap (G). The case, in which the coil end (23e) of the field winding (23i) can be arranged on the air gap (G) or on the axial end face of the rotor core (11), may be employed, if, in the method of manufacturing a rotary electric machine (1), the step of winding the field winding (23i) is performed after setting the rotor core (11) in the stator core (21).

Advantages of Embodiment

With the configuration described above, in the present embodiment, it is possible to prevent the field windings (23) and the armature windings (24) from crossing each other. Therefore, in this embodiment, it is possible to downsize the coil ends in the hybrid excitation flux switching motor.

Second Embodiment

Figure 5:
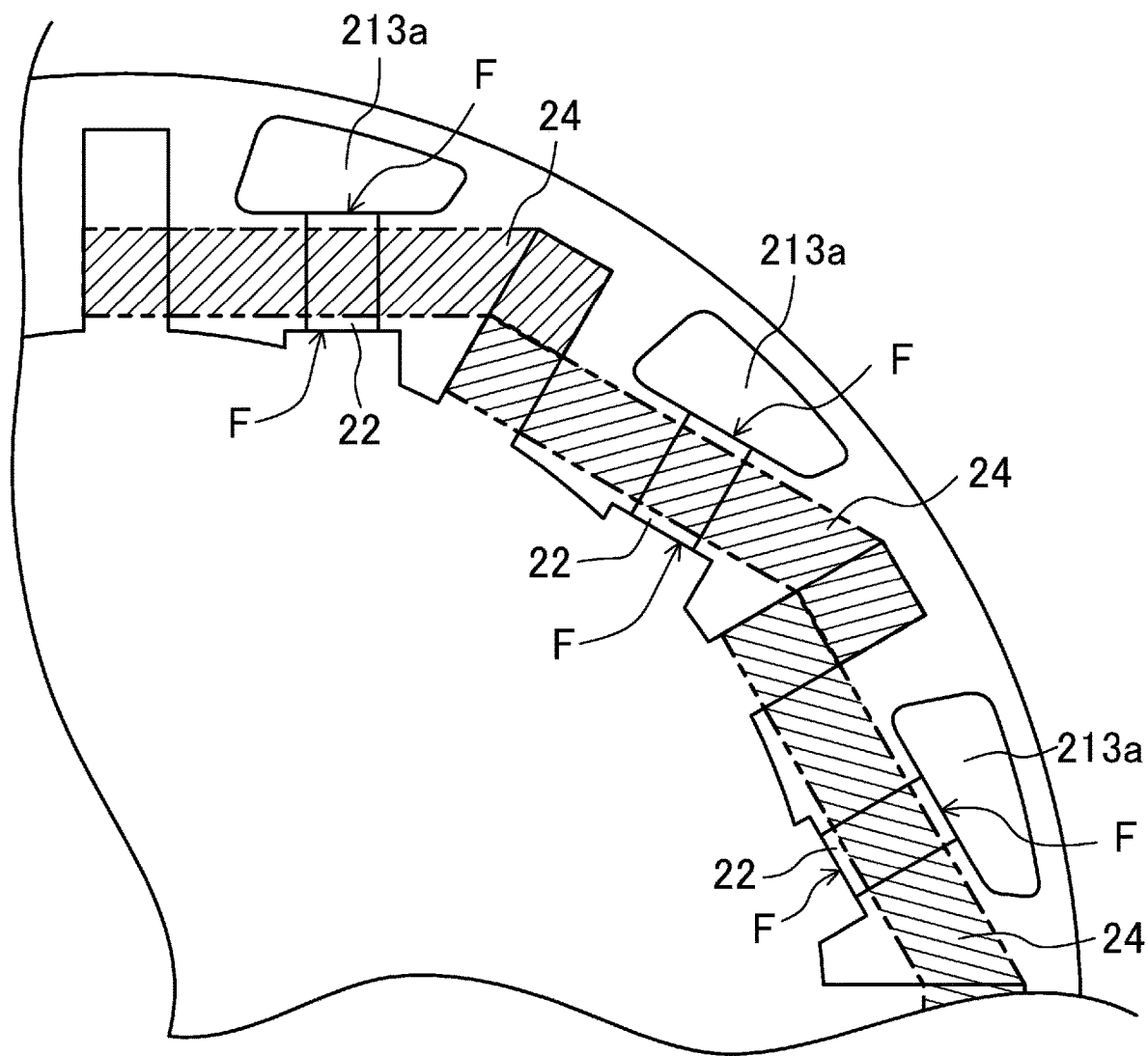
FIG. 5 is plan view of a stator core of a second embodiment.

FIG. 5 shows a plan view of a stator (20) according to the second embodiment of the present invention. FIG. 5 only shows a part of the stator (20). Further, the field windings (23) are omitted in the FIG. 5. In this embodiment, as shown in FIG. 5, each of the permanent magnets (22) has two surfaces (hereinafter referred to as surfaces (F)) extending in parallel to each other and facing to the field windings (23). The shape of the field slot (213a) is determined such that the surfaces (F) and the direction, in which the coil end (24e) of one of the armature windings (24) passes over the axial end face of one of the permanent magnets (22), are in parallel to each other in the state in which the one of the permanent magnets (22) is arranged in the corresponding field slot (213*a*). As a result, the coil end (24*e*) of the respective the armature windings (24) can be arranged to connect linearly between the armature slots (213*b*). Therefore, in this embodiment, the coil end (24*e*) of the respective armature windings (24) can be easily formed. Further, the degree of deformation of the armature windings (24) can be made smaller, resulting in reducing stress on the armature windings (24) and the possible insulation breakdown, as well as in shortening the length of the coil ends.

Further, in the example of FIG. 5, the field slots (213*a*) conform to the inclination of the permanent magnets (22) so as to be asymmetrical to the line connecting the center of the figure of the permanent magnets (22) (the center of the FIG. 5) with the axis (P). Such asymmetrical shape of the field slots (213*a*) enables to ensure the area of the field slots (213*a*) necessary for winding the field windings (23).

Third Embodiment

Figure 6:
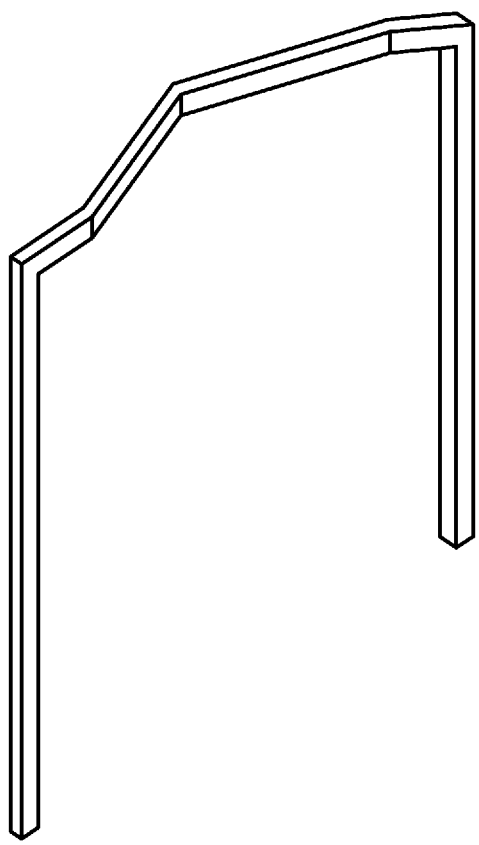
FIG. 6 shows an example of a segment which is a member constituting a segment coil.
Figure 7:
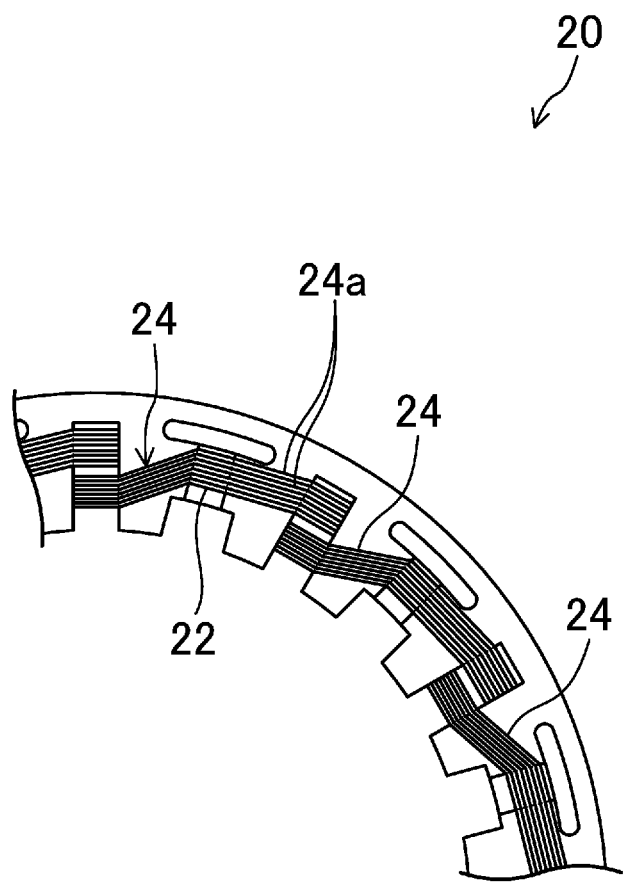
FIG. 7 shows a state in which segments are arranged in armature slots.

The third embodiment of the present invention relates to another configuration example of armature windings (24). In this embodiment, the armature windings (24) are formed in a manner of, so to speak, segment coils. FIG. 6 shows an example of a segment (24*a*) which is a member constituting a segment coil. This segment (24*a*) is obtained through bending of a flat conductive wire into a substantially U-shape. Further, in this embodiment, each of the segments (24*a*) is inserted into the corresponding one of the armature slots (213*b*) in the axial direction and arranged in radial direction of the armature teeth (211*b*). Each end of the segments (24*a*) is appropriately wired so that armature windings (24) are formed. FIG. 7 shows a state in which the segments (24*a*) are arranged in one of the armature slots (213*b*). As shown in FIG. 7, also in this example, one of the armature windings (24) straddles the predetermined one of the field slots (213*a*), and the coil end (24*e*) is arranged to pass over the axial end face of the corresponding one of permanent magnets (22) in the field slot (213*a*) which the armature winding (24) straddles. Note that FIG. 7 only shows a part of a stator (20). The field windings (23) and the rotor (10) are omitted in this figure. In this electric motor (1), it is possible to enhance the space factor by employing the manner of segment coils. Further, it is possible to reliably avoid the interference of the coil end (24*e*) of each of the armature windings (24) with the corresponding one of field windings (23) adjacent to the permanent magnets (22). Therefore, also in this embodiment, it is possible to downsize the coil ends in the hybrid excitation flux switching motor.

Fourth Embodiment

Figure 8:
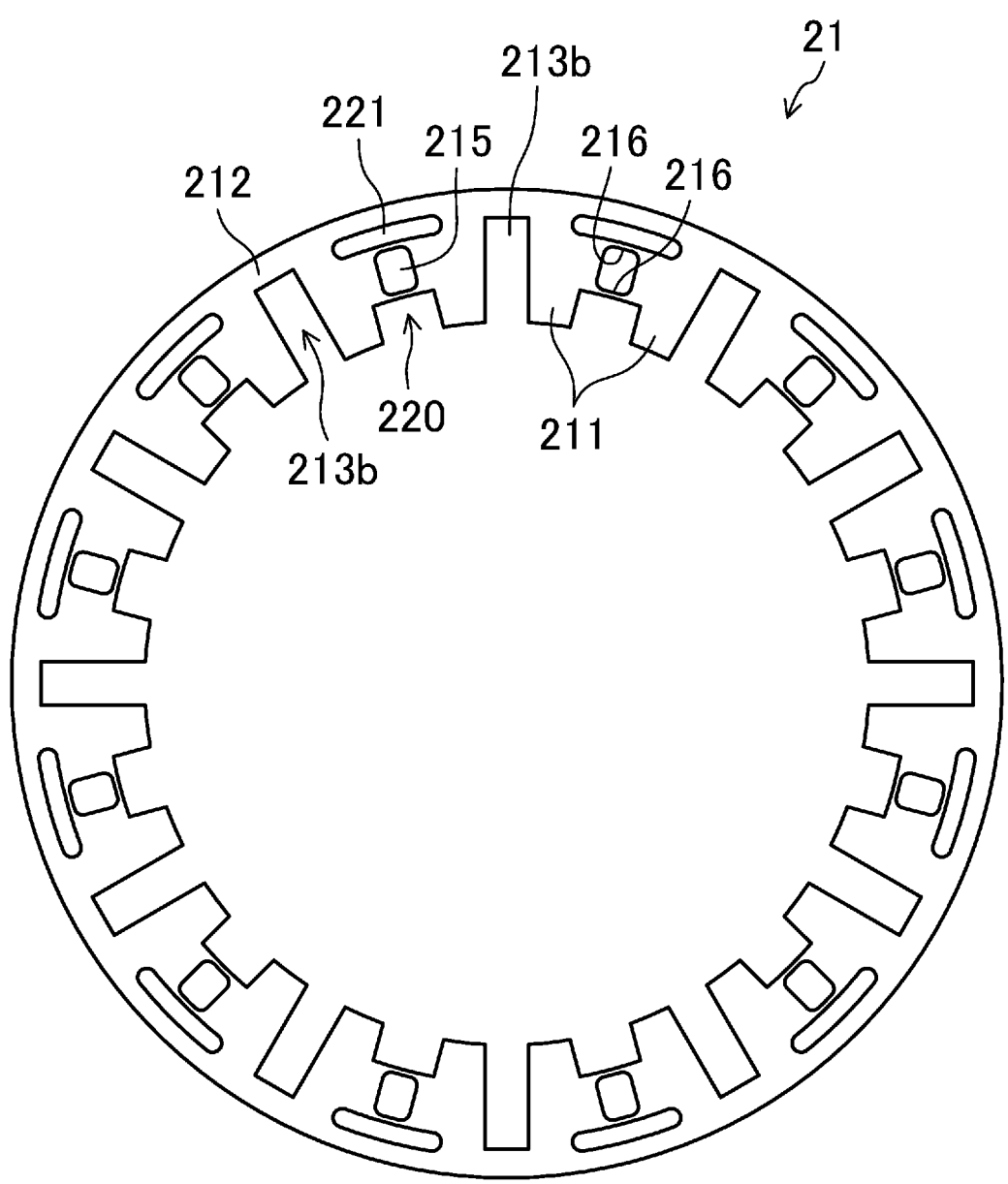
FIG. 8 is a plan view of a stator core constituting a stator of a fourth embodiment.

FIG. 8 shows a plan view of a stator core (21) constituting the stator (20) of the fourth embodiment of the present invention.

The stator core (21) is made of a soft magnetic material and formed into a ring-like shape. Also in this example, the stator core (21) is a multilayer core formed by stacking, in the axial direction, many core members obtained by pressing an electromagnetic sheet FIG. 8 is a view of the stator core (21) as viewed in the axial direction. As shown in FIG. 8, the stator core (21) includes a stator yoke (212) and teeth (211). The stator yoke (212) is formed into a ring-like shape on the outer circumferential side of the stator core (21). The teeth (211) project from the inner circumferential surface of the stator yoke (212) toward the inner circumferential side. In the example of FIG. 8, 24 teeth (211) are provided which are arranged at predetermined pitches in the circumferential direction about the axis (P). As a result, a space is formed between the teeth (211).

These spaces formed between the teeth (211) function as slots each housing field windings (23) or armature windings (24). These slots include two types: Slots (referred to as an inner field slot (220)) for housing the field windings (23) and the other slots (designated as an armature slot (213 *b*)) for housing the armature windings (24). Specifically, the inner field slots (220) are pairs of the slots, each of which are adjacent to each other along the circumference of the stator yoke (212), with one of the slots interposed therebetween. The armature slots (213*b*) are those slots which are other than the inner field slots (220). In other words, the inner field slots (220) and the armature slots (213*b*) are arranged alternately along the circumference of the stator yoke (212).

The stator core (21) includes magnet slots (215) housing permanent magnets (22). Each of the magnet slots (215) are through-holes passing through the stator core (21) in the axial direction. In this example, each of the magnet slots (215) is formed to be adjacent to the outer circumferential side of the corresponding one of the inner field slots (220). Each of the magnet slots (215) houses the corresponding one of permanent magnets (22).

Further, in this embodiment, outer field slots (221) are provided as slots housing field windings (23). Each of the outer field slots (221) is adjacent to the outer circumferential side of the corresponding one of the magnet slots (215) (see FIG. 8). The outer field slots (221) are also through-holes passing through the stator core (21) in the axial direction. Between each of the outer field slots (221) and the corresponding one of the magnet slots (215), there is provided a wall surface (216) separating them. Similarly, also between each of the inner field slots (220) and the corresponding one of the magnet slots (215), there is provided a wall surface (216) separating them.

As is the case with the first embodiment, the field windings (23) and the armature windings (24) are also wound around the stator core (21).

—Armature Windings (24)—

In the stator (20) of this embodiment, each of the armature windings (24) is wound around the teeth (211) and housed in the armature slots (213*b*). More specifically, each of the armature windings (24) is wound around one of the pairs of the teeth (211) interposed between one of the pairs of the armature slots (213*b*) adjacent to each other along the circumference of the stator yoke (212). Specifically, each of the armature windings (24) is wound around the corresponding one of the pairs of armature teeth (211), with the radial axis regarded as a winding axis. In other words, each of the armature windings (24) is, as a concentrated winding, wound around the corresponding one of the pairs of teeth (211) regarded as a single teeth.

—Field Windings (23)—

The field windings (23) are for controlling the magnetic flux of the permanent magnets (22). Of the field windings (23), there are ones housed in the inner field slots (220) on the inner circumferential side of the permanent magnets (22), and the others housed in the outer field slots (221) on the outer circumferential side of the permanent magnets (22). For example, the field windings (23), which are closer to the inner circumferential side than the permanent magnets (22) are, are wound around the teeth (211) and arranged in the corresponding one of the inner field slots (220). In this example, the field windings (23) are wound around a pair of teeth (211) interposed between a pair of inner field slots (220), which are adjacent to each other along the circumference of the stator yoke (212). Specifically, each of two field windings (23) is wound around the corresponding one of the pairs of teeth (211), with the radial axis regarded as the winding axis. In other words, the armature windings (24) are, as a concentrated winding, wound around the corresponding one of the pairs of teeth (211) regarded as a single teeth.

Further, the field windings (23) on the outer circumferential side of the permanent magnets (22) are wound around one of the pairs of teeth (211) interposed between one of the pairs of outer field slots (221), which are adjacent to each other. In other words, the field windings (23) are, as a concentrated winding, wound around the corresponding one of the pairs of teeth (211) regarded as a single teeth. In this way, according to this embodiment of the present invention, each of the outer armature slots (221) houses the corresponding two of the field windings (23). In this example, two field windings (23) in the corresponding one of the outer field slots (221) are adjacent to each other along the circumference of the stator yoke (212).

—Permanent Magnets (22)—

The stator (20) is provided with a plurality of permanent magnets (22). In this example, the permanent magnets (22) are rare-earth magnets made of rare-earth elements, as is the case with the first embodiment.

Figure 9:
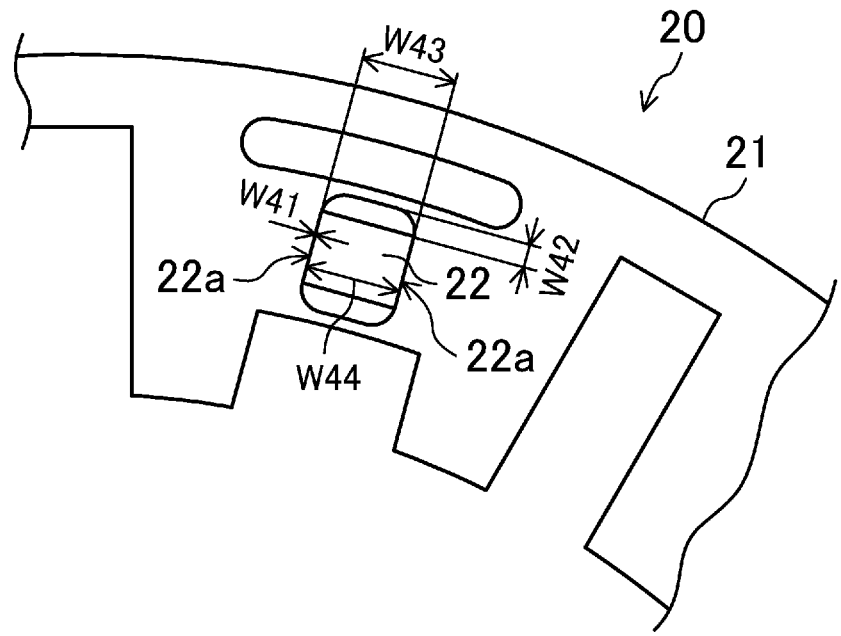
FIG. 9 shows a state in which a permanent magnet is inserted in the stator core.

The permanent magnets (22) are formed into a quadrangular shape in its cross section (the plane shown in FIG. 1) orthogonal to the axis (P) (in this example, a rectangular cross-section with longer sides in the radial direction). The permanent magnets (22) have almost the same axial length as the stator core (21). That is, the permanent magnets (22) of this embodiment are rectangular parallelepipeds. FIG. 9 shows a state in which the permanent magnet (22) is inserted in the stator core (21). These permanent magnets (22) are arranged in the respective magnet slots (215) so that the magnetic pole surface (22a) of the same polarity face to each other along the circumference of the stator yoke (212). In other words, the permanent magnets (22) are magnetized along the circumference of the stator yoke (212). These permanent magnets (22) are arranged such that their magnetic pole faces (22a) facing in one direction along the circumference of the stator yoke (212) have alternately different polarity.

Also in this example, each of the armature windings (24) passes over the corresponding one of the permanent magnets (22). (See FIG. 1.) Further, the permanent magnets (22) face to the field windings (23) in the inner field slots (220) via one of the wall surfaces (216) on the side of the one of the inner field slots (220), and further face to the field windings (23) in one of the outer field slots (221) via one of wall surfaces (216) on the side of the one of the outer field slots (221) (see FIG. 9). More specifically, two field windings (23) are provided for a pair of field teeth (211a). These field windings (23) face to the permanent magnet (22) via the respective wall surfaces (216) both on the inner circumferential side and on the outer circumferential side of the permanent magnet (22). That is, the field winding (23) faces to the permanent magnets (22) in the magnet slots (215) via the stator core (21) both on the inner and the outer circumferential sides. Further, as for the relationship of the permanent magnets (22) to the armature windings (24), also in this example, the coil end (24e) is arranged such that each of the armature windings (24) straddles the predetermined one of the field slots (213a) and passes over the axial end face of one of the permanent magnets (22) in the field slot (213a) over which the armature winding (24) straddles.

Figure 10:
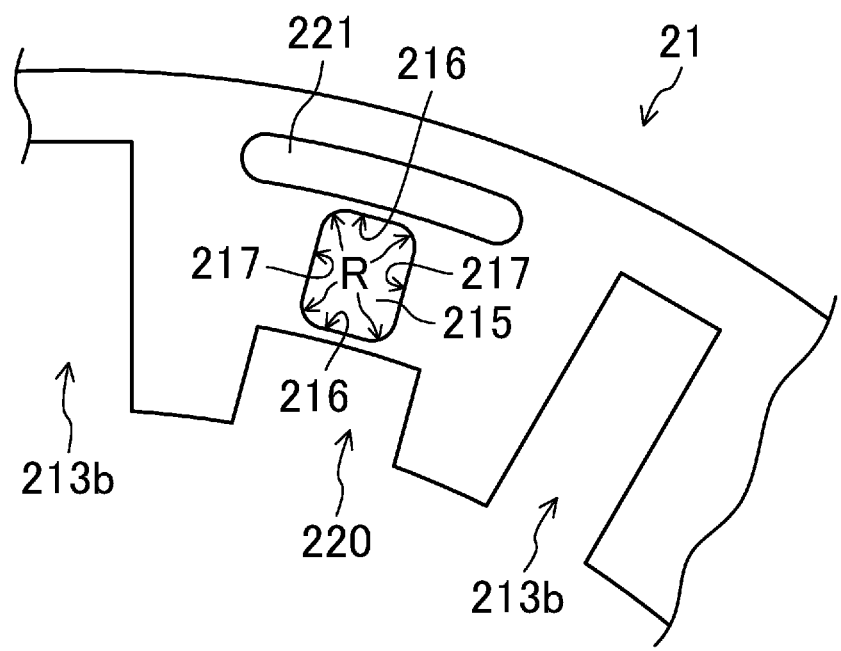
FIG. 10 shows, on an enlarged scale, a part surrounding a magnet slot of the stator core.

In this embodiment, the relationship of each of the permanent magnets (22) to the corresponding one of the inner circumferential surfaces (including wall surfaces (216)) magnet slots (215) is characteristic. The field windings (23) and the armature windings (24) are omitted in FIG. 9. FIG. 10 shows, on an enlarged scale, a part surrounding one of the magnet slots (215) of the stator core (21). As shown in FIG. 9, in this example, the clearance (W41) between the magnetic pole surface (22a) of one of the permanent magnets (22) and the surface of one of the magnet slots (215) (referred to as opposing surface (217)) opposite to the above magnetic pole surface (22a) is formed to be smaller than the clearance (W42) between the wall surface (216) and the permanent magnet (22) (That is, W41<W42). More specifically, the magnetic pole surface (22a) of the permanent magnet (22) and the opposing surface (217) of the magnet slot (215) are in close contact with each other. That is, in this example, W41=0. On the other hand, there is a clearance between the wall surface (216) and the permanent magnet (22). That is, in this example, W42>0.

In order to achieve this relationship of the clearance (W41<W42), in this embodiment, the distance (W44) between the magnetic pole surfaces (22a) of the permanent magnet (22) is made substantially the same as the radial width (W43) of the magnet slot (215) so that the magnetic pole faces (22a) of the permanent magnet (22) come into close contact with the opposing surface (217) of the magnet slot (215). In practice, the relationship of W44<W43 is determined such that the permanent magnet (22) can be inserted into the magnet slot (215). However, the dimensional difference between W44 and W43 is negligible so that W44 and W43 are substantially the same. Further, in this example, as shown in FIG. 9, a curved portion (R) is provided at each of the inner corner portions of the magnet slot (215). The curved portion (R) enables radial positioning of the permanent magnet (22) in the magnet slot (215) at the time of inserting the permanent magnet (22) into the magnet slot (215), and forming a clearance between the wall surface (216) and the permanent magnet (22).

It is also possible to make the magnetic pole surface (22a) of the permanent magnet (22) and the opposing surface (217) of the magnet slot (215) come into close contact with each other by employing a press-fitting structure. Specifically, forming the distance (W44) between the magnetic pole surfaces (22a) of the permanent magnet (22) to be larger than the radial width (W43) of the magnet slot (215) enables the realization of the press-fitting structure.

Advantages of Embodiment

With the configuration described above, also in this embodiment, the downsizing of the coil end can be achieved in the hybrid excitation flux switching motor.

Further, in this embodiment, wall surfaces (216) are provided between the magnet slot (215) and the field slot (220, 221), thereby enabling the enhancement of the strength of the stator core (21). Furthermore, the clearance (W41) between the magnetic pole surface (22a) of the permanent magnet (22) and the opposing surface (217) of the magnet slot (215) is formed to be smaller than the clearance (W42) between the corresponding wall surface (216) and the permanent magnet (22), which also enables the suppression of the increase in flux leakage.

Moreover, in this embodiment, there is a clearance between the corresponding wall surface (216) and the permanent magnet (22), so that the heat transmission from the field winding (23) to the permanent magnet (22) is also reduced. As a result, in this embodiment, it is possible to reduce the demagnetization of the permanent magnets (22) due to heat of windings.

Other Embodiments

The field winding (23) can also be formed in the manner of segment coil.

The number of the teeth (211) of the stator (20) or the number of the projections (111) of the rotor (10) is merely examples, and the present invention is not limited to the embodiments.

The configurations of the embodiments are applicable not only to electric motors but also to power generators.

Further, the materials of the permanent magnets (22) are merely exemplary ones. It is also possible to form the permanent magnets (22) from magnet materials free from heavy rare-earth elements.

INDUSTRIAL APPLICABILITY

The present invention is useful as a rotary electric machine.

DESCRIPTION OF REFERENCE CHARACTERS

1 Motor (rotary electric machine)
11 Rotor Core
21 Stator Core
22 Permanent Magnet
23 Field Winding
23e Coil End
24 Armature Winding
24e Coil End
211 Teeth
211c Flange
212b Armature Yoke Part (Edge Portion)
213a Field Slot
213b Armature Slot

The invention claimed is:

1. A rotary electric machine, comprising:
field windings supplied with DC power;
armature windings supplied with AC power;
a stator core formed into a ring-like shape including field slots and armature slots, the field slots housing the field windings, the armature slots housing the armature windings, the field slots and the armature slots alternating in a circumferential direction of the stator core;
permanent magnets housed in magnet slots formed in the field slots, each magnet slot being adjacent in the radial direction to a field slot on an inner circumferential side and on an outer circumferential side of the magnet slot; and
a rotor core opposite to the stator core, with a predetermined air gap being interposed between the rotor and stator, wherein
each of the permanent magnets is arranged in a corresponding magnet slot such that each magnetic pole face of one the permanent magnets faces, in a circumferential direction, to a magnetic pole face of an adjacent one of the permanent magnets and a non-pole face directly faces, in the radial direction, to a field winding on an outer circumferential side and on an inner circumferential side of the magnet slots,
coil ends of the armature windings straddle predetermined ones of the field slots and pass over an axial end face of the permanent magnets in the predetermined field slots, and
the field windings are arranged such that coil ends of the field windings do not intersect with coil ends of the armature windings as viewed from an axial direction of the stator core.

2. The rotary electric machine of claim 1, wherein a radial width of the armature slots is equal to or less than twice as large as a radial width of the permanent magnets.

3. The rotary electric machine of claim 1, wherein the armature windings are made of segment coils.

4. The rotary electric machine of claim 1, wherein a non-pole face of the permanent magnets facing a field winding is parallel to a direction in which the coil end of the armature windings passes over the axial end face of the permanent magnets.

5. A rotary electric machine, comprising:
field windings supplied with DC power;
armature windings supplied with AC power;
a stator core formed into a ring-like shape including field slots and armature slots, the field slots housing the field windings, the armature slots housing the armature windings, the field slots and the armature slots alternating in a circumferential direction of the stator core;
permanent magnets housed in magnet slots formed in the field slots, each magnet slot being adjacent in the radial direction to a field slot on an inner circumferential side and on an outer circumferential side of the magnet slot; and
a rotor core opposite to the stator core, with a predetermined air gap being interposed between the rotor and stator, wherein
each of the permanent magnets is arranged in a corresponding magnet slot such that each magnetic pole face of one the permanent magnets faces, in a circumferential direction, to a magnetic pole face of an adjacent one of the permanent magnets and a non-pole face directly faces, in the radial direction, to a field winding on an outer circumferential side and on an inner circumferential side of the magnet slots,
coil ends of the armature windings straddle predetermined ones of the field slots and pass over an axial end face of the permanent magnets in the predetermined field slots,
the stator core has an edge portion closer to an outer circumferential side of the stator than the armature slots,
a coil end of the field windings arranged on an outer circumferential side of the permanent magnets passes over the axial end face of the edge portion, and
a radial width of the edge portion is larger than a radial width of the field windings arranged on the outer circumferential side of the permanent magnets.

6. A rotary electric machine, comprising:
field windings supplied with DC power;
armature windings supplied with AC power;
a stator core formed into a ring-like shape including field slots and armature slots, the field slots housing the field windings, the armature slots housing the armature windings, the field slots and the armature slots alternating in a circumferential direction of the stator core;
permanent magnets housed in magnet slots formed in the field slots, each magnet slot being adjacent in the radial direction to a field slot on an inner circumferential side and on an outer circumferential side of the magnet slot; and a rotor core opposite to the stator core, with a predetermined air gap being interposed between the rotor and stator, wherein each of the permanent magnets is arranged in a corresponding magnet slot such that each magnetic pole face of one the permanent magnets faces, in a circumferential direction, to a magnetic pole face of an adjacent one of the permanent magnets and a non-pole face directly faces, in the radial direction, to a field winding on an outer circumferential side and on an inner circumferential side of the magnet slots, coil ends of the armature windings straddle predetermined ones of the field slots and pass over an axial end face of the permanent magnets in the predetermined field slots, the stator core includes teeth, between the field slots and the armature slots, around which at least one of the field windings and armature windings are wound, surfaces of the teeth facing the armature slots are provided with flanges protruding into the armature slots, and a coil end of the field windings arranged on an inner circumferential side of the permanent magnets passes over an axial end face of the flange.

7. A rotary electric machine, comprising:
field windings supplied with DC power;
armature windings supplied with AC power;
a stator core formed into a ring-like shape including field slots and armature slots, the field slots housing the field windings, the armature slots housing the armature windings, the field slots and the armature slots alternating in a circumferential direction of the stator core;

permanent magnets housed in magnet slots formed in the field slots, each magnet slot being adjacent in the radial direction to a field slot on an inner circumferential side and on an outer circumferential side of the magnet slot; and a rotor core opposite to the stator core, with a predetermined air gap being interposed between the rotor and stator, wherein each of the permanent magnets is arranged in a corresponding magnet slot such that each magnetic pole face of one the permanent magnets faces, in a circumferential direction, to a magnetic pole face of an adjacent one of the permanent magnets and a non-pole face directly faces, in the radial direction, to a field winding on an outer circumferential side and on an inner circumferential side of the magnet slots, coil ends of the armature windings straddle predetermined ones of the field slots and pass over an axial end face of the permanent magnets in the predetermined field slots, and the coil end of the field windings arranged on the inner circumferential side of the permanent magnets passes over at least one of the air gap and the axial end face of the rotor core.

* * * * *